J. TARALLE.
LOCK FOR BICYCLES.
APPLICATION FILED OCT. 7, 1916.
1,218,336.
Patented Mar. 6, 1917.
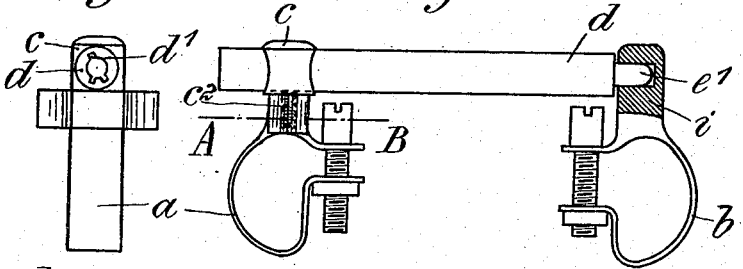
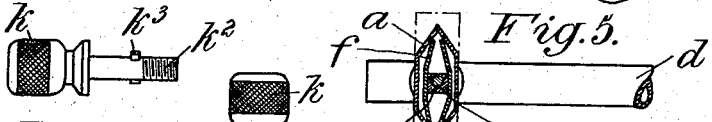
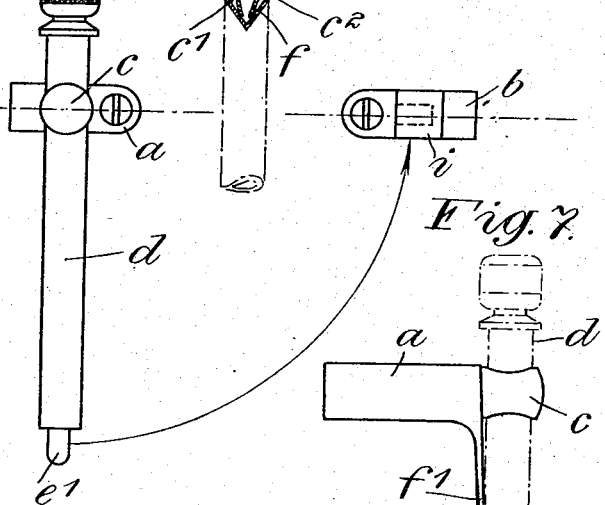
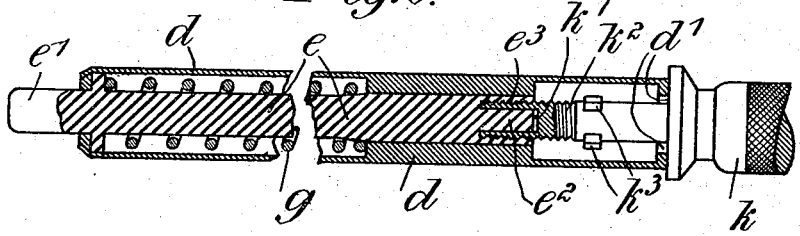
Inventor
Julien Taralle
By Serrell Son
his Attorney

UNITED STATES PATENT OFFICE.

JULIEN TARALLE, OF GENEVA, SWITZERLAND.

LOCK FOR BICYCLES.

1,218,336.

Specification of Letters Patent.

Patented Mar. 6, 1917.

Application filed October 7, 1916. Serial No. 124,255.

*To all whom it may concern:*

Be it known that I, JULIEN TARALLE, mechanician, a citizen of Switzerland, residing at Geneva, Canton of Geneva, in the Confederation of Switzerland, have invented certain new and useful Improvements in Locks for Bicycles, of which the following is a specification.

The object of the invention is the provision of a lock for bicycles intended to lock temporarily one of the wheels in order to prevent it from turning.

The annexed drawing shows a working form of my invention in which—

Figure 1 is a general view of the lock, with the key removed, fixed to the fork of a bicycle.

Fig. 2 is a view as seen from left to right in Fig. 1.

Fig. 3 shows the key separately.

Fig. 4 represents the position of the lock unlocked, and with the key in place.

Fig. 5 is a section on line A—B of the left hand side of Fig. 1 and seen from underneath.

Fig. 6 is a central longitudinal cross section showing the construction of the lock-bolt, and Fig. 7 illustrates an alternative means of holding the lock in its unlocked position.

$a$ and $b$ are collars which are adapted to be clamped to the parts of the rear fork of a bicycle. A stud $c$ is attached to the collar $a$, and has secured to it a tube $d$ in which a bolt $e$ is lodged. The stud $c$ is adapted to turn on the collar $a$ by means of a trunnion $c^1$ having a squared part which is clamped by a double spring $f$. This spring is fast to the collar $a$ and causes the tube $d$ to take either one or the other of the two positions shown in the drawing, to wit either the position shown in Fig. 1, where the tube $d$ is passed between the spokes of the bicycle wheel, or the position shown in Fig. 4, in which the said tube is held fast outside of the spokes.

A clamping screw $c^2$ is employed to secure the tube $d$ in position in the stud $c$, so as to permit the tube to be adjusted to place depending upon the distance between the parts of the fork to which the collars $a$—$b$ are fixed.

A bolt $e$ is lodged within tube $d$ and is normally maintained in such a position, by means of a helical spring $g$, that its extreme end $e^1$ projects beyond the end of the tube. This end $e^1$ is adapted to engage in a catch $i$ provided for this purpose in the collar $b$ as is shown in Fig. 1.

In order to make it possible to pull the lock-bolt $e$ backward so as to withdraw it from the catch $i$ the said bolt is provided with an axial annular hole $e^3$ which hole is threaded on the outside wall and partly obstructed by the core $e^2$. I also employ a key $k$ represented in Figs. 3 and 6. The key is also provided with an axial hole $k^1$ adapted to fit the core $e^2$ and is further provided with screw threads $k^2$ on the outside adapted to engage the threads of the hole $e^3$ of lock-bolt. This key $k$ is also provided with laterally projecting teeth $k^3$ on its outside so that it can only be introduced through an opening at the end of tube $d$ provided with notches $d^1$ corresponding to the teeth $k^3$.

The key thus fitted has to be introduced far enough into the tube $d$ and turned to engage the threads in the hole $e^3$, as is to be seen in Fig. 6, and then it may be pulled outwardly together with the bolt $e$ so as to withdraw the extremity of the latter from the catch $i$. When thus unlocked the tube $d$ together with the lock-bolt lodged therein may be swung from the position shown in Fig. 1 to the position shown in Fig. 4, so as not to interfere with the spokes in the revolution of the wheel.

The tube $d$ and lock-bolt $e$ contained therein instead of being cylindrical as represented in the drawing may both be square, or rectangular, or other suitable shape in cross section.

As shown in Fig. 7 instead of having a squared part on stud $c$ and using the double spring $f$, I may employ an exterior hollow spring $f^1$ secured to the collar and partly surrounding tube $d$ so as to keep it in position where the bolt is unlocked.

I claim as my invention:

1. A bicycle lock comprising a pair of collars adapted to be secured to the fork parts of a bicycle frame, a tube adjustably connected to and adapted to turn on one of said collars, a bolt movable longitudinally in said tube, and having a projecting end extending beyond the tube, a socket secured in the other collar and adapted to receive the projecting end of the bolt to lock the same and the tube in position, means for normally maintaining said bolt in position with its projecting end extending from the tube, and means separable from the tube for moving the said bolt to draw its projecting end within the tube.

2. A bicycle lock comprising a pair of collars adapted to be secured to the fork parts of a bicycle frame, a tube adjustably connected to and adapted to turn on one of said collars, a bolt movable longitudinally in said tube, and having an end projecting beyond the same, means for normally maintaining the said bolt in position with its said end projecting beyond the tube, a socket secured to the other collar and adapted to receive the projecting end of the said bolt, and a key adapted to be inserted in the said tube to engage the said bolt to draw the projecting end thereof within the said tube.

3. A bicycle lock comprising a pair of collars adapted to be secured to the fork parts of a bicycle frame, a tube adjustably connected to and adapted to turn on one of said collars, a bolt movable longitudinally in said tube, and having an end projecting beyond the same, means for normally maintaining the said bolt in position with its said end projecting beyond the tube, a socket secured to the other collar and adapted to receive the projecting end of the said bolt, a key adapted to be inserted in the said tube to engage the said bolt to draw the projecting end thereof within the said tube, and means for maintaining the said tube and bolt in their inoperative position.

4. A bicycle lock comprising a pair of collars adapted to be secured to the fork parts of a bicycle frame, a stud revolubly connected to one of the said collars and having a flattened portion, a tube adjustably connected to the said stud, a bolt longitudinally movable within the said tube and having an end normally projecting beyond one end of the tube, means for normally maintaining the said bolt in position with its projecting end extending beyond the end of the tube, a socket connected to the other collar and adapted to receive the projecting end of the said bolt, means for engaging the flattened portion of the said stud to maintain the same with the tube and bolt in an inoperative position, and a key adapted to be inserted in the said tube to engage the bolt so as to move the same and withdraw the projecting end thereof into the tube.

5. A bicycle lock comprising a pair of collars adapted to be secured to the fork parts of a bicycle frame, a stud member swiveled in one of the said collars and provided with a flattened portion, a tube adjustably connected in the said stud member, a bolt longitudinally movable within said tube and having an end normally projecting beyond one end of the tube, a helical spring within the said tube for maintaining the said bolt in its normal position, a socket secured to the other collar and adapted to receive the projecting end of the said bolt, a key adapted to be inserted in the opposite end of the tube and to engage with the said bolt to move the same so as to withdraw its projecting end from the socket member, and a flat spring for engaging the flattened side of the said stud to maintain the same together with the tube and bolt in an inoperative position.

In testimony whereof I affix my signature in presence of two witnesses.

JULIEN TARALLE.

Witnesses:
OTMER SCHNEIDER,
LEÓN WEIL.

Copies of this patent may be obtained for five cents each, by addressing the "Commissioner of Patents, Washington, D. C."